US008483199B2

(12) United States Patent
Yuk et al.

(10) Patent No.: US 8,483,199 B2
(45) Date of Patent: Jul. 9, 2013

(54) METHOD FOR TRANSMITTING AND RECEIVING BROADCASTING CHANNELS

(75) Inventors: Young Soo Yuk, Anyang-si (KR); Ki Seon Ryu, Anyang-si (KR); In Uk Jung, Anyang-si (KR); Jeong Ki Kim, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 12/992,891

(22) PCT Filed: May 15, 2009

(86) PCT No.: PCT/KR2009/002598
§ 371 (c)(1),
(2), (4) Date: Jan. 11, 2011

(87) PCT Pub. No.: WO2009/139605
PCT Pub. Date: Nov. 19, 2009

(65) Prior Publication Data
US 2011/0110341 A1 May 12, 2011

Related U.S. Application Data

(60) Provisional application No. 61/053,330, filed on May 15, 2008, provisional application No. 61/056,830, filed on May 29, 2008.

(51) Int. Cl.
*H04W 4/00* (2009.01)
*H04W 84/12* (2009.01)
(52) U.S. Cl.
CPC .................................... *H04W 84/12* (2013.01)
USPC ............................ 370/338; 370/204; 375/260

(58) Field of Classification Search
CPC ...................................................... H04W 84/12
USPC ......... 370/312, 328–330, 338–345, 203–208;
375/260–265
See application file for complete search history.

(56) References Cited

U.S. PATENT DOCUMENTS

| 5,604,744 | A | 2/1997 | Andersson et al. | |
|---|---|---|---|---|
| 7,826,419 | B2 * | 11/2010 | Wang et al. | 370/329 |
| 2004/0100920 | A1 * | 5/2004 | Ball et al. | 370/318 |
| 2006/0268755 | A1 * | 11/2006 | Pajukoski et al. | 370/282 |
| 2008/0039133 | A1 * | 2/2008 | Ma et al. | 455/552.1 |
| 2009/0180413 | A1 * | 7/2009 | Sutton | 370/311 |
| 2009/0185543 | A1 * | 7/2009 | Chen et al. | 370/338 |
| 2010/0103810 | A1 * | 4/2010 | Kloos et al. | 370/204 |

FOREIGN PATENT DOCUMENTS

KR 10-0697974 3/2007

* cited by examiner

*Primary Examiner* — Kan Yuen
(74) *Attorney, Agent, or Firm* — Lee, Hong, Degerman, Kang & Waimey

(57) ABSTRACT

A method for transmitting and receiving a broadcast channel is disclosed. A wireless access system, a method for effectively transmitting and receiving a broadcast channel, a variety of superframe structures, and a super frame header structure are disclosed. A method for effectively receiving a broadcast channel includes receiving, by a mobile station (MS), a first broadcast channel including first information about a modulation and coding scheme (MCS) applied to a second broadcast channel, and receiving the second broadcast channel using the first information. The first broadcast channel is transmitted using a fixed modulation and coding scheme (MCS) value, and the second broadcast channel is transmitted using a variable modulation and coding scheme (MCS) value.

9 Claims, 10 Drawing Sheets

FIG. 5
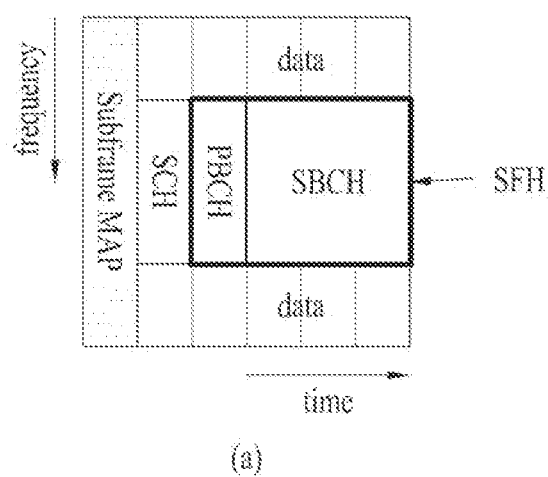
(a)
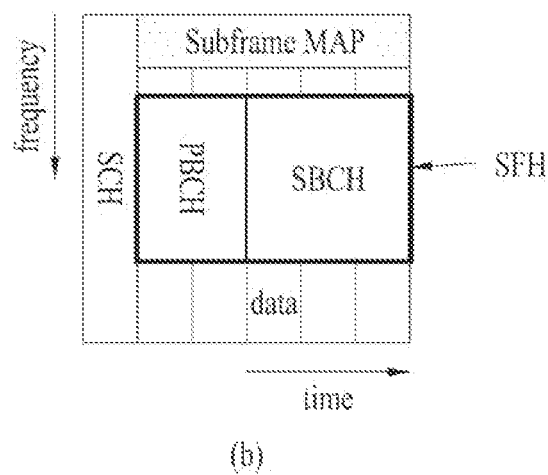
(b)

FIG. 6
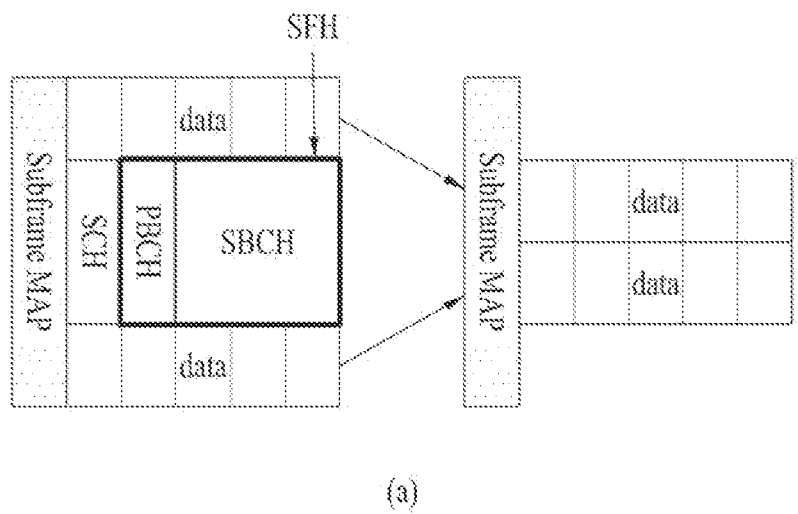
(a)
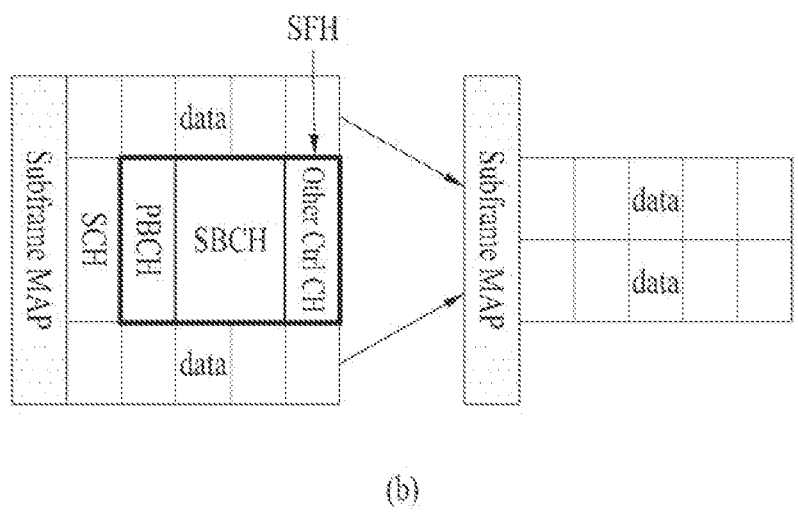
(b)

FIG. 7
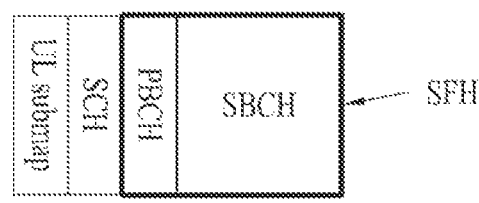
(a)
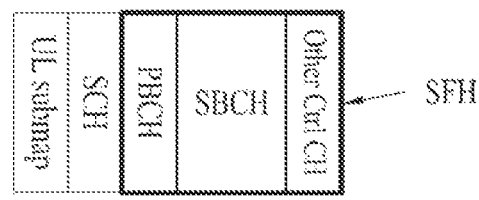
(b)

METHOD FOR TRANSMITTING AND RECEIVING BROADCASTING CHANNELS

CROSS-REFERENCE TO RELATED APPLICATIONS

This application is the National Stage filing under 35 U.S.C. 371 of International Application No. PCT/KR2009/002598, filed on May 15, 2009, which claims the benefit of U.S. Provisional Application Ser. Nos. 61/056,830, filed on May 29, 2008, and 61/053,330, filed on May 15, 2008, the contents of which are all hereby incorporated by reference herein in their entirety.

BACKGROUND OF THE INVENTION

1. Field of the Invention

The present invention relates to a wireless access system, and more particularly to a method for effectively transmitting and receiving a broadcast channel, and providing a variety of superframe structures and a super frame header structure.

2. Discussion of the Related Art

FIG. 1 is a structural view illustrating an example of a frame structure.

Referring to FIG. 1, one superframe includes one or more frames, and one frame may include one or more subframes. In addition, one subframe may include one or more Orthogonal Frequency Division Multiplexing Access (OFDMA) symbols. The lengths and numbers of superframes, frames, subframes and symbols may be changed according to user requirements or system environments, etc.

An Institute of Electrical and Electronics Engineers (IEEE) 802.16 system or a $3^{rd}$ Generation Project Partnership 2 (3GPP2) UMB system may have a superframe having the length of 20 ms. In FIG. 1, it is assumed that the length of one superframe is 20 ms and the length of one frame is 5 ms. That is, one superframe may be composed of 4 frames, and one frame may be composed of 8 subframes. At this time, one subframe may be composed of 6 OFDMA symbols.

In FIG. 1, a first subframe of each superframe includes a Super Frame Header (SFH). The SFH may be broadcast to a channel for transmitting system information through the entire cell. The 3GPP system includes a broadcast channel (BCH) serving as a channel similar to the SFH.

A subframe MAP is present in the front part of the subframe contained in the superframe. The subframe MAP may include control information of each subframe.

One or more control channels may be contained in the SFH. Individual control channels may include different information due to a difference in individual transmission purposes, and be transmitted. Preferably, since the SFH and the BCH are transmitted to all cells of the entire network, the SFH and the BCH may be transmitted using the safest method. Therefore, the SFH or the BCH may be coded at the lowest Modulation and Coding Scheme (MCS) level.

However, transmission of all channels contained in SFH or BCH at the lowest MCS level may cause large overhead to a system.

SUMMARY OF THE INVENTION

Accordingly, the present invention is directed to a method for transmitting and receiving a broadcast channel that substantially obviates one or more problems due to limitations and disadvantages of the related art.

An object of the present invention is to provide a method and apparatus for effectively transmitting a control channel.

Another object of the present invention is to provide a method for providing a new SFH structure and adjusting an MCS level of the SFH.

Another object of the present invention is to provide a method for classifying an SFH into a primary broadcast channel and a secondary broadcast channel, and differently establishing and changing MCS levels of a primary broadcast channel and a secondary broadcast channel in such a manner that a method for effectively transmitting a control channel is provided.

A further object of the present invention is to provide a variety of SFH structures for effectively utilizing data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention relates to a wireless access system, provides a method for effectively transmitting and receiving a broadcast channel, and also provides a variety of superframe structures.

To achieve these objects and other advantages and in accordance with the purpose of the invention, as embodied and broadly described herein, a method for effectively receiving a broadcast channel includes receiving, by a mobile station (MS), a first broadcast channel including first information about a modulation and coding scheme (MCS) applied to a second broadcast channel, and receiving, by the mobile station (MS), the second broadcast channel using the first information, wherein the first broadcast channel is transmitted using a fixed modulation and coding scheme (MCS) value, and the second broadcast channel is transmitted using a variable modulation and coding scheme (MCS) value.

The first broadcast channel may be a primary broadcast channel (PBCH), and the second broadcast channel may be a secondary broadcast channel (SBCH).

The first broadcast channel may be a synchronization channel (SCH), and the second broadcast channel may be a super frame header (SFH), wherein the super frame header (SFH) includes a primary broadcast channel (PBCH) and a secondary broadcast channel (SBCH).

In one embodiment aspect of the present invention, the first information may represent a predetermined MCS level according to a cell type of a base station (BS). The first information may represent a predetermined MCS level according to the number of transmission (Tx) antennas of a base station (BS). The first information may represent a predetermined MCS level according to an interference level of a base station (BS), the interference level being a Frequency Reuse Factor (FRF).

The primary broadcast channel (PBCH) may be allocated to a symbol located after a second symbol of a first subframe contained in a first frame of a superframe, and may be allocated earlier than the secondary broadcast channel (SBCH).

The method may further include, if the MCS value applied to the second broadcast channel is changed, receiving, by the mobile station (MS), a first broadcast channel including second information about the changed MCS, and receiving a second broadcast channel using the second information.

In another aspect of the present invention, a method for effectively transmitting a broadcast channel includes transmitting, by a base station (BS), a first broadcast channel including first information about a modulation and coding scheme (MCS) applied to a second broadcast channel, and transmitting, by the base station (BS), the second broadcast channel using the first information, wherein the first broadcast channel is transmitted using a fixed modulation and coding scheme (MCS) value, and the second broadcast channel is transmitted using a variable modulation and coding scheme (MCS) value.

In another embodiment of the present invention, the first broadcast channel may be a primary broadcast channel (PBCH), and the second broadcast channel may be a secondary broadcast channel (SBCH). The first broadcast channel may be a synchronization channel (SCH), and the second broadcast channel may be a super frame header (SFH), wherein the super frame header (SFH) may include a primary broadcast channel (PBCH) and a secondary broadcast channel (SBCH).

In another embodiment of the present invention, the first information may represent a predetermined MCS level according to a cell type of the base station (BS) or the number of transmission (Tx) antennas of the base station (BS). The first information may represent a predetermined MCS level according to an interference level of the base station (BS). The interference level may be a Frequency Reuse Factor (FRF).

In another embodiment of the present invention, the primary broadcast channel (PBCH) may be allocated to a symbol located after a second symbol of a first subframe contained in a first frame of a superframe, and may be allocated earlier than the secondary broadcast channel (SBCH).

In another embodiment of the present invention, the method may further include, if the MCS value applied to the second broadcast channel is changed, transmitting, by the base station (BS), a first broadcast channel including second information about the changed MCS, and transmitting a second broadcast channel using the second information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a structural view illustrating another example of a super frame header (SFH) structure according to one embodiment of the present invention.

FIG. 6 is a conceptual diagram illustrating a method for using a data region in a subframe including a super frame header (SFH) according to one embodiment of the present invention.

FIG. 7 is a conceptual diagram illustrating another example of a super frame header (SFH) structure according to one embodiment of the present invention.

DESCRIPTION OF SPECIFIC EMBODIMENTS

Figure 1:
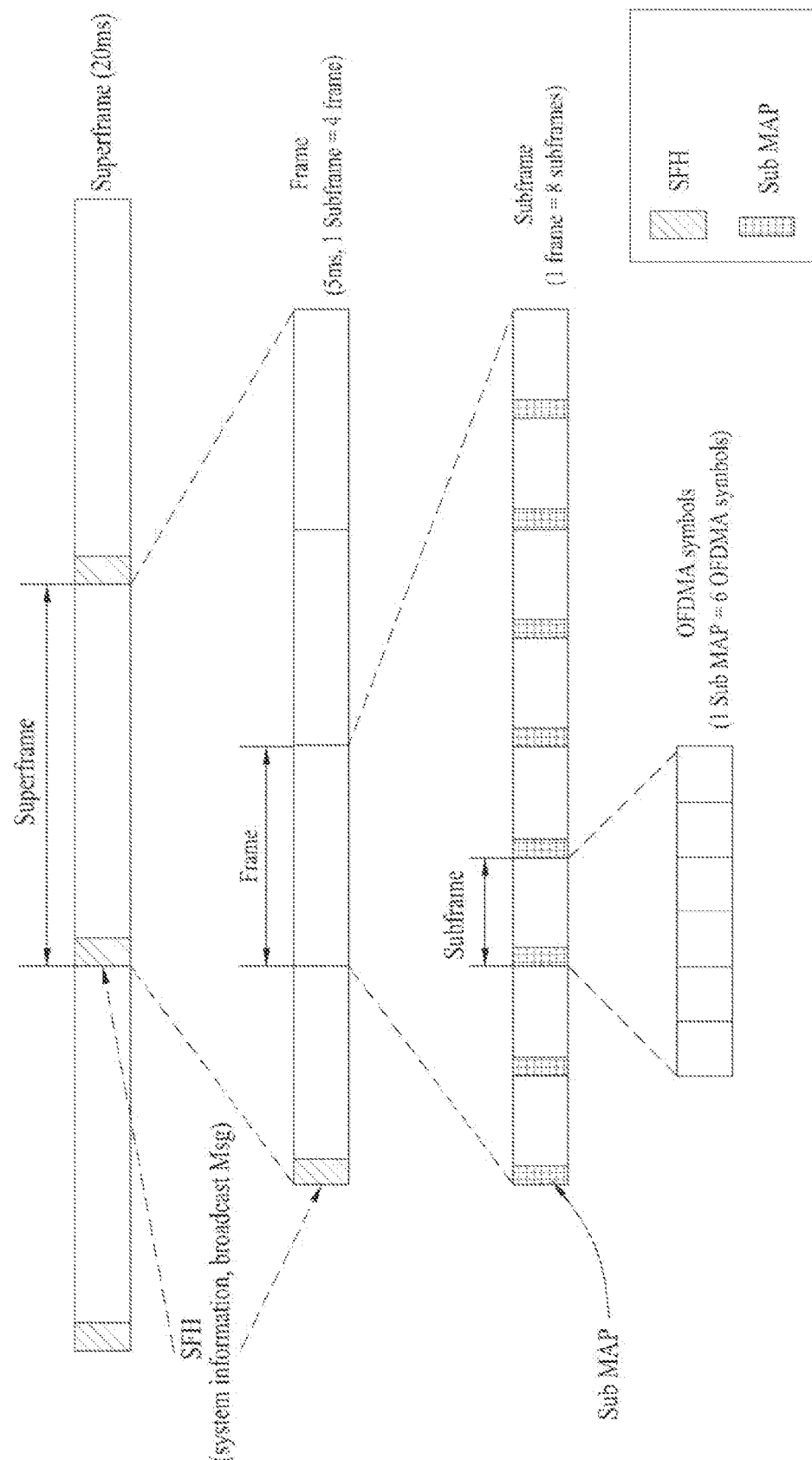
FIG. 1 is a structural view illustrating an example of a frame structure.

Reference will now be made in detail to the preferred embodiments of the present invention, examples of which are illustrated in the accompanying drawings. Wherever possible, the same reference numbers will be used throughout the drawings to refer to the same or like parts. Exemplary embodiments of the present invention provide a wireless access system. The embodiments of the present invention describe various methods for effectively transmitting and receiving a control channel, and various superframe structures for the same.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may confuse the substance of the present invention, are not explained. Additionally, procedures or steps, which can be understood by those skilled in the art, are not explained as well.

In exemplary embodiments of the present invention, a description is made of a data transmission and reception relationship between a base station (BS) and a Mobile Station (MS). Herein, the term 'BS' refers to a terminal node of a network, which communicates directly with the MS. In some cases, a specific operation described as being performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point (AP)', etc. The term 'MS' may be replaced with the term 'User Equipment (UE)', 'Subscriber Station (SS)', 'Mobile Subscriber Station (MSS)', 'mobile terminal', 'terminal', etc.

A transmitter means a fixed or mobile node that transmits voice or data service and a receiver means a fixed or mobile node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode—Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MM-MB terminal refers to a terminal which has a multi-modem chip built therein and which can operate in any of a mobile Internet system and other mobile communication systems (e.g. CDMA 2000, WCDMA, etc.)

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of P802.16-2004, P802.16e-2005, and P802.16Rev2 documents which are the standards of IEEE 802.16.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Specific terms used for the exemplary embodiments of the present invention are provided to aid in understanding of the present invention. These specific terms may be replaced with other terms within the scope and spirit of the present invention.

For example, the SFH may also be called a super MAP or a broadcast channel (BCH). In addition, the subframe MAP may also be called a Sub MAP or an advanced MAP. The advanced MAP may also be called a new MAP. In this case, the sub MAP may conceptually include a DL-Sub MAP and a UL-Sub MAP. In the following embodiments of the present invention, SCH, PBCH, or SBCH may be called a control channel for transmitting system information.

In the following embodiments of the present invention, SFH may include broadcast channels, i.e., a primary broadcast channel (PBCH) and a secondary broadcast channel (SBCH). The PBCH may be referred to as a Primary Super Frame Header (P-SFH), the SBCH may be referred to as a Secondary Super Frame Header (S-SFH).

In this case, the PBCH may include Network-Common information commonly used in a network. In addition, the SBCH may include cell-specific information specific to a predetermined cell or sector-specific information. Furthermore, the subframe MAP may include resource allocation information.

PBCH and SBCH may be changed according to whether transmission information is changed or not. However, PBCH can transmit almost invariable information, and SBCH can transmit more rapidly changing information. Upon receiving information contained in the SFH, the MS (mobile terminal) can perform initial network entry to the BS.

<SFH Structure>

Figure 2:
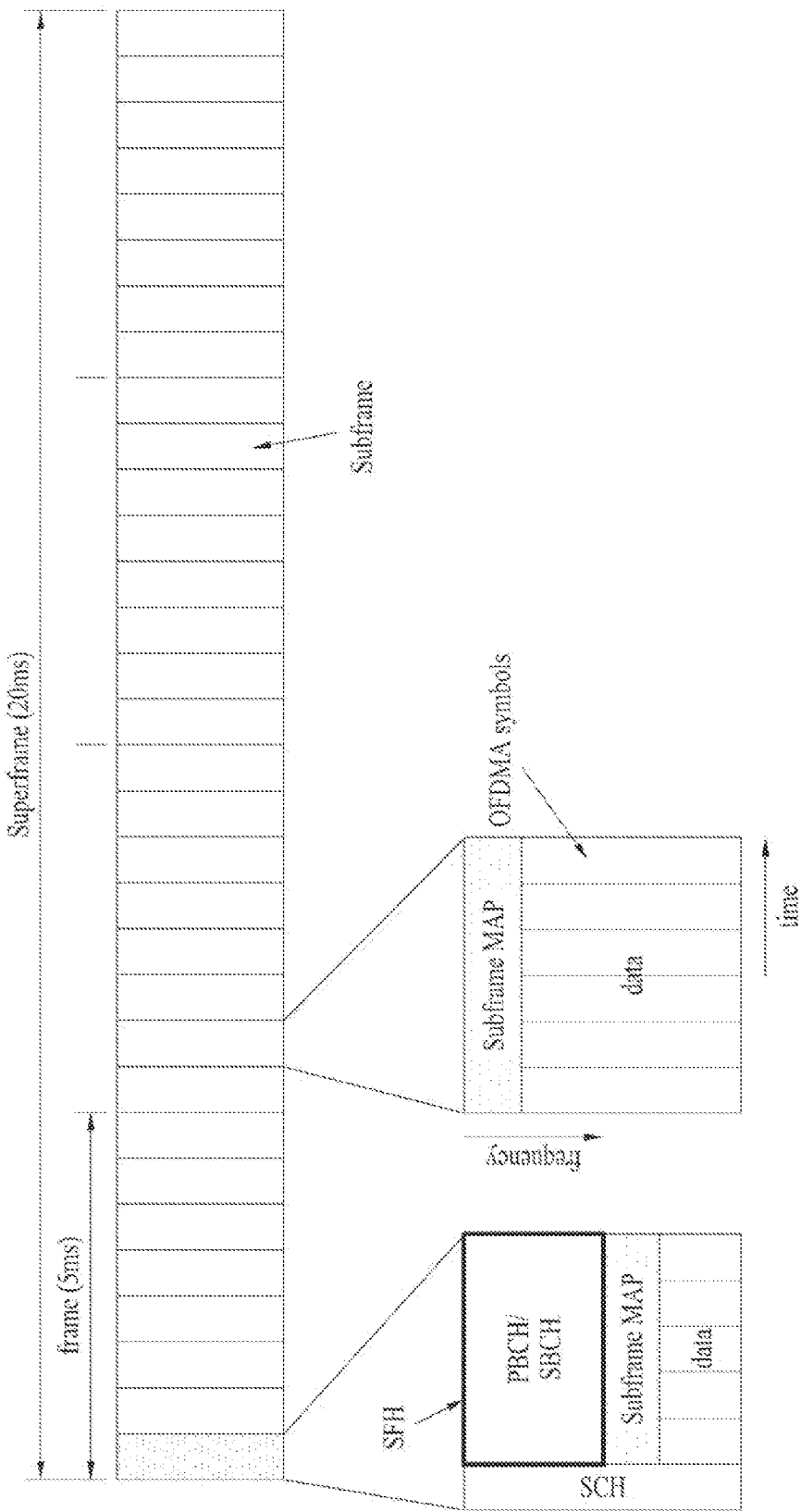
FIG. 2 is a structural view illustrating an example of a superframe structure according to embodiments of the present invention.

FIG. 2 is a structural view illustrating an example of a superframe structure according to embodiments of the present invention.

In FIG. 2, the BS and the MS can transmit and receive the SFH and/or the subframe MAP using a Frequency Divisional Multiplexing (FDM) scheme.

Referring to FIG. 2, the BS can transmit at least one of a synchronization channel (SCH), an SFH, a subframe MAP, and data to the MS in a first subframe of a first frame. In this case, the SFH may include a PBCH and an SBCH. The BS broadcasts the SCH including synchronization information using a first OFDMA symbol, and transmits the SFH and the subframe MAP through some logical resource units (LRUs). Each LRU may be composed of a predetermined number of subcarriers in one or more OFDMA symbol regions.

The BS may transmit the subframe MAP to the MS in the remaining subframes other than a first subframe of a first frame of a superframe. In this case, the subframe MAP including resource allocation information may be transmitted through a predetermined LRU.

Figure 3:
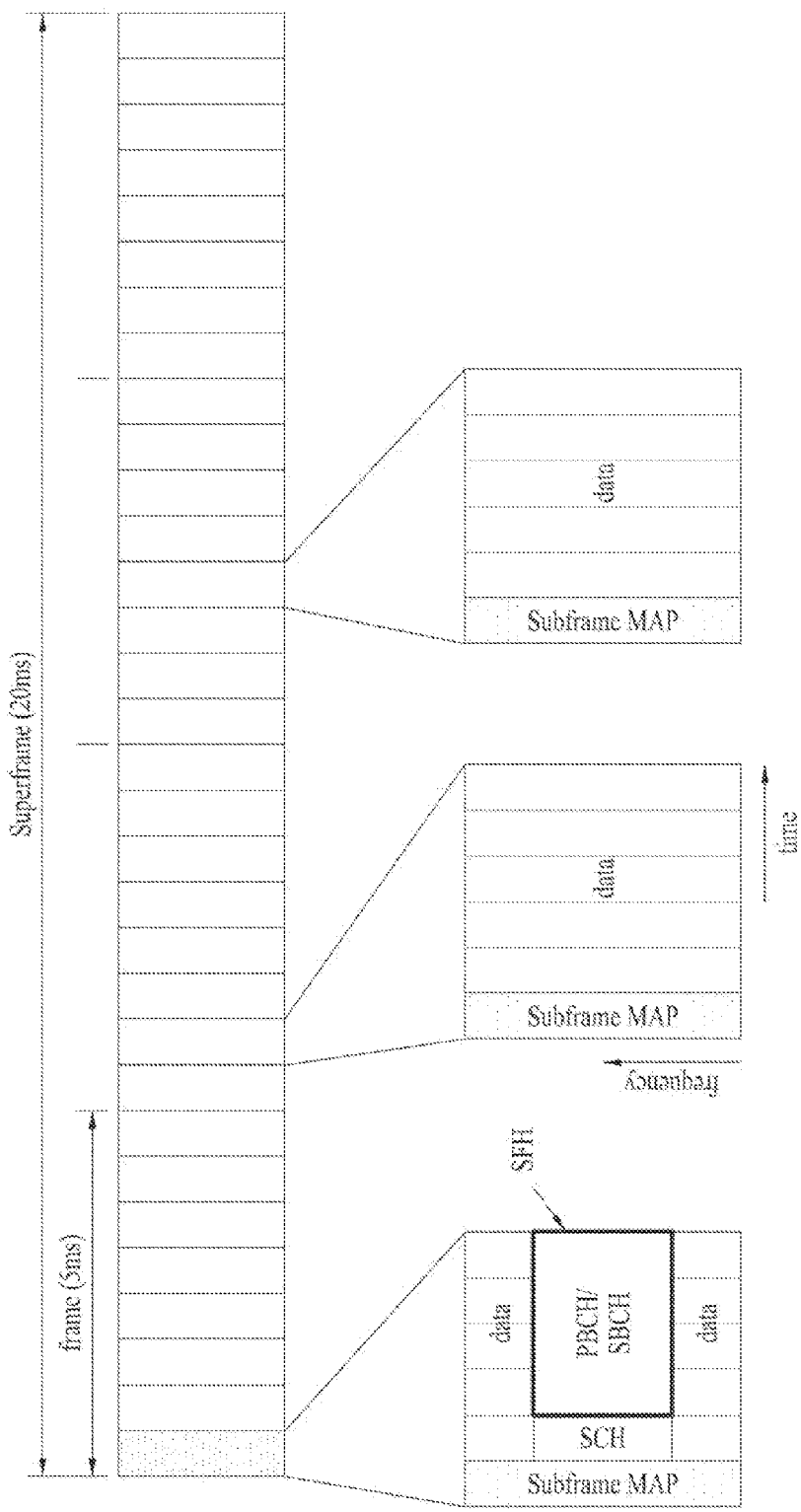
FIG. 3 is a structural view illustrating another example of a superframe structure according to embodiments of the present invention.

FIG. 3 is a structural view illustrating another example of a superframe structure according to embodiments of the present invention.

In FIG. 3, the BS and the MS may transmit an SFH and/or a subframe MAP using a Time Divisional Multiplexing (TDM) scheme.

Referring to FIG. 3, the BS may transmit at least one of a synchronization channel (SCH), an SFH, a subframe MAP, and data to the MS in a first subframe of a first frame. In this case, the SFH may include a PBCH and an SBCH.

In FIG. 3, the BS transmits a subframe MAP including resource allocation information using a first OFDMA symbol, and transmits an SCH including information for synchronization in a second OFDMA symbol. In addition, the BS can transmit the SFH using the remaining OFDMA symbols. In this case, the BS may use only a predetermined number of subcarrier regions without using all regions of the OFDMA symbol so as to transmit the SCH and the SFH. That is, in order to effectively utilize resources, a data channel may be allocated to an OFDMA symbol region in which no SCH and no SFH are allocated.

The BS may transmit a subframe MAP to the MS in the remaining subframes other than a first subframe of a first frame of a superframe. In this case, the subframe MAP includes resource allocation information of each subframe, so that it is preferable that the subframe MAP be allocated to a first OFDMA symbol of each subframe.

Figure 4:
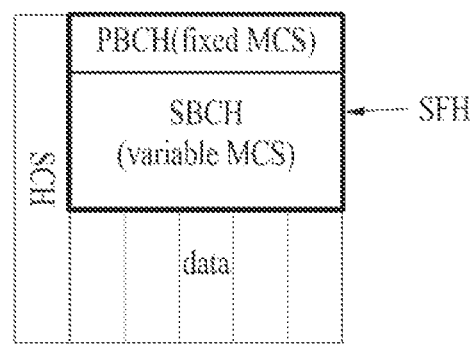
FIG. 4 is a structural view illustrating one example of a super frame header (SFH) structure according to one embodiment of the present invention.

FIG. 4 is a structural view illustrating one example of a super frame header (SFH) structure according to one embodiment of the present invention.

Referring to FIG. 4, the SFH is allocated using the FDM scheme in the same manner as in FIG. 2. In FIG. 4, the SFH may include a PBCH and an SBCH. In this case, the PBCH and the SBCH can be distinguished from each other according to the FDM scheme. The PBCH may have a fixed number of low-level MCSs, and the SBCH may have a variable MCS according to a condition.

Referring to FIG. 4, the PBCH having a predetermined LRU size is located at the top of a subframe, and the SBCH may be located at the next part of the PBCH using a predetermined LRU. In this case, a data channel may be allocated to the remaining OFDMA symbol regions.

In this case, information about a variable MCS size may be notified using various methods. In one method, Variable MCS size information about the SBCH may be contained in the PBCH.

In another method, the BS may inform the MS of the SBCH MCS size information using cell type information contained in the PBCH. That is, the BS may inform the MS of a predetermined MCS level depending on a cell type. In other words, the BS may inform the MS of a predetermined MCS level according to a cell type.

In another method, the BS may inform the MS of SBCH MCS size information using antenna information (e.g., information about the number of antennas) contained in a PBCH. In this case, it is assumed that a minimum MCS requisite for the number of antennas is predetermined, so that the MS decodes information about the number of antennas contained in the PBCH so that it can obtain a necessary MCS level.

MCS information, cell type information, antenna information, etc. may be transmitted through an SCH. In this case, the MS decodes the SCH so that it can acquire the MCS level of the SBCH. In this case, the BS may variably apply the MCS level to the SBCH and the PBCH.

FIG. 5 is a structural view illustrating another example of a super frame header (SFH) structure according to one embodiment of the present invention.

FIG. 5(a) is a detailed structural view illustrating a subframe structure and a superframe header structure shown in FIG. 3. That is, FIG. 5 shows that a PBCH and an SBCH are allocated using a TDM scheme. Specifically, the SFH is allocated only to some parts of the entire band of the OFDMA symbol. In this case, the subframe MAP may be allocated using the TDM scheme.

As can be seen form FIG. 5(b), the SFH is allocated using the TDM scheme, the SCH may be allocated using a first OFDMA symbol, and the subframe MAP and the SFH may be allocated only to some bands of the OFDMA symbol. In this case, it is preferable that the PBCH having a fixed MCS value be allocated earlier than the SBCH in the corresponding subframe in such a manner that the PBCH can be transmitted to the MS at a time earlier than that of the SBCH.

The SBCH of the SFH structure described in FIG. 5 may include a Broadcast System Descriptor Indicator (BSDI) for indicating a Broadcast System Descriptor (BSD) contained in another subframe.

The broadcast system descriptor (BSD) may be adapted to transmit broadcast information not transmitted due to limited capacity of SFH, and may have a transmission period longer than that of the SFH. In addition, since various types of BCDs having different periods may be transmitted, the BS may inform the MS of which BSD is transmitted to a current superframe through the SFH such that the MS can easily search for a transmission time of the BSD.

FIG. 6 is a conceptual diagram illustrating a method for using a data region in a subframe including a super frame header (SFH) according to one embodiment of the present invention.

The subchannel structure shown in FIG. 6(a) is identical to that of FIG. 5(a). FIG. 6(b) shows that an additional control channel (or another control channel) is present in the SFH. Namely, FIG. 6(b) shows that another control channel is allocated to the last OFDMA symbol to which the SBCH of FIG. 6(b) is allocated.

In the embodiments of the present invention, a subframe including the SFH may have various subframe configurations. In fact, the subframe including the SFH is unable to use the same structure as in a general subframe due to the presence of SFH, and an arrangement structure of each channel contained in the subframe is changed, resulting in difficulty in allocating a data channel.

Assuming that a channel region including the SFH is limited to a specific frequency band in the subframe structure shown in FIG. 6, the remaining regions may be used as a data channel, and thus the resultant data channel may have the same characteristics as those of a data channel having a small bandwidth shown in FIG. 6. That is, the present invention can effectively use a data channel region, and can support a system having various bandwidths according to a communication environment.

FIG. 7 is a conceptual diagram illustrating another example of a super frame header (SFH) structure according to one embodiment of the present invention.

The subframe structures shown in FIGS. 7(a) and 7(b) are similar to those of FIGS. 6(a) and 6(b). However, FIG. 7 shows that all the bands (not some bands) of the OFDMA symbol are used. That is, if the SFH occupies all of one subframe, the SFH may be configured in FIG. 7(a) or 7(b).

In addition, since all of a subframe MAP, an SCH, and an SFH are allocated to one subframe, a region to which a data channel is to be allocated is not present in a corresponding subframe. That is, a channel region for DL data is not present. Accordingly, the subframe MAP may include only an uplink (UL) subframe MAP (or UL-sub MAP).

<Method for Transmitting Broadcast Channel>

PBCH is a broadcast channel that needs to be first received in the MS, so that it is necessary for the MS to quickly receive the PBCH without any assistance. That is, MSs contained in the cell region of the entire network has to stably receive the PBCH.

Generally, the SFH (or BCH) contained in the cell has to satisfy a cell coverage of 95%, meaning that that the MS needs to receive the SFH at a Packet Error Rate (PER) of less than 1% in a region of 95% or more covering the cell. In order to satisfy the above-mentioned condition, it is necessary for the SFH (or BCH) to be fixedly transmitted with a fixed size and a low Modulation and Coding Set (MCS) level although high overhead occurs. Such fixed transmission condition needs to be applied to the present invention irrespective of a specific cell sector or enterprise.

Preferably, such a fixed transmission condition may be recognized by all MSs contained in the entire cell region. Therefore, all the MSs contained in the cell may receive an SCH, and then decode a PBCH using fixed MCS information pre-recognized for PBCH reception.

Generally, the above-mentioned fixed condition needs to be established under the worst case having the worst communication environment, and has to satisfy a minimum requirement prescribed in each standard. That is, the BS has to transmit a PBCH at the highest reliability, so that the BS is obliged to transmit the PBCH at the lowest coding rate although a current transmission environment is better than an actual transmission environment.

On the other hand, the SBCH includes variable information, so that the SBCH need not be transmitted with a fixed size and a low MCS level. Therefore, the MCS level of the SBCH may be changed through the PBCH. In fact, MCS required for the SBCH may be changed according to a cell type (1), a network deployment (2), and the number of antennas and/or various communication environments (3). Hereinafter, individual cases (1) to (3) in which an MCS level of the SBCH can be changed will be described below.

(1) The MCS level of the SFH (e.g., SBCH) may be changed according to a cell type.

Cells are classified into a macro cell that covers a relatively large region, and a micro cell, a pico cell and a femto cell that cover a relatively small cell region. That is, different radiuses are assigned to individual cells, so that there is a difference in intensity of a signal that is transmitted and received in each cell.

Therefore, it is preferable that MCS levels of the PBCH be identical to each other in all cells, so that the PBCH is generally transmitted at an MCS level capable of being applied to a macro cell. However, in the case of using the SBCH, a different MCS may be applied to the SBCH.

For example, if a signal is transmitted and received in a femto cell, a cell radius of the femto cell is small, so that a Signal to Noise Ratio (SNR) relatively higher than that of the macro cell can be maintained. That is, assuming that the magnitude of radio resources used for the SBCH is constant, much more data can be transmitted using a high MCS level and the same SBCH resources. In addition, assuming that the amount of data to be transmitted over the SBCH is constant, the BS can transmit data using less SBCH resources, so that transmission efficiency of a broadcast channel (BCH) can be increased.

That is, the SBCH is transmitted using different MCSs of individual cell types, so that BSs located in individual cells can transmit transmission (Tx) efficiency. However, assuming that different MCS levels are used in individual cells, the size of data capable of transmitting the SBCH may be changed in each cell. Therefore, a transmission period of a BCH may be changed according to characteristics of individual cells, and data that need not be transmitted may be generated.

In conclusion, assuming that the same MCS is applied to the SBCH according to a cell type, the MS and the BS may predefine an MCS for each cell type. Therefore, the BS informs the MS of the cell type so that the MS can recognize the MCS level.

(2) The MCS level of the SFH (e.g., SBCH) may be changed according to a network deployment.

The MCS level of the SBCH may be changed according to an interference level contained in a network. For example, the MCS level may be changed according to a Frequency Reuse Factor (FRF) applied to the inside of the cell.

If the FRF is set to ½, one half of total radio resources is used. Hence, assuming that a coding rate in case of 'FRF=1' is denoted by 'R', a coding rate of 2*R is used. In addition, assuming that the FRF is set to ⅓ (i.e., FRF=⅓), a coding rate of 3*R is used.

Therefore, an amount of resources used by the SBCH is fixed according to an FRF such that the MCS level corresponding to each FRF can be defined. The following Table 1 represents the number of transmittable bits according to FRF and MCS.

TABLE 1

|            | 1/12 QPSK | 1/8 QPSK | 1/4 QPSK |
|------------|-----------|----------|----------|
| FRF = 1    | A/6       | A/4      | A/2      |
| FRF = 1/2  | A/12      | A/8      | A/4      |
| FRF = 1/3  | A/18      | A/12     | A/6      |

Table 1 shows the number of transmittable bits for each MCS in association with the SBCH that uses a fixed resource A (Resource A). An amount of available resources is changed according to an FRF. If the MCS and the FRF are combined with each other, a total of 6 bit numbers can be obtained as shown in Table 1. In addition, the BS informs the MS of an interference level (e.g., FRF) shown in Table 1, so that it can indirectly inform the MS of the MCS level.

(3) The MCS level of the SFH (e.g., SBCH) can be changed according to the number of antennas.

The MCS level of the SBCH can be differently decided according to the number of antennas of the BS. In general, it is impossible for the BS to transmit a broadcast channel (SFH or BCH) using a closed loop MIMO technology, and it is possible for the BS to transmit the broadcast channel (SFH or BCH) using an open loop MIMO technology.

That is, the BS may use a method for maximizing a transmission (Tx) diversity using the open loop MIMO technology, and there is a difference in diversity gain according to the number of Tx antennas of the BS, so that MCS requirements for transmitting the SFH within a cell coverage may be changed according to the number of Tx antennas of the BS.

As described above, the BS and the MS may pre-establish a minimum MCS level for each number of BS antennas. Therefore, the BS informs the MS of the number of current Tx antennas of the BS, so that it can indirectly inform the MS of MCS level information.

As shown in the above-mentioned examples 1) to 3), the BS can indirectly transmit the MCS level of the SBCH to the MS. In addition, the BS may directly inform the MS of the MCS level applied to the SBCH using the PBCH.

As another embodiment of the present invention, methods for effectively transmitting a broadcast channel by changing an MCS level of the SBCH according to the above-mentioned conditions will hereinafter be described with reference to the accompanying drawings.

Figure 8:
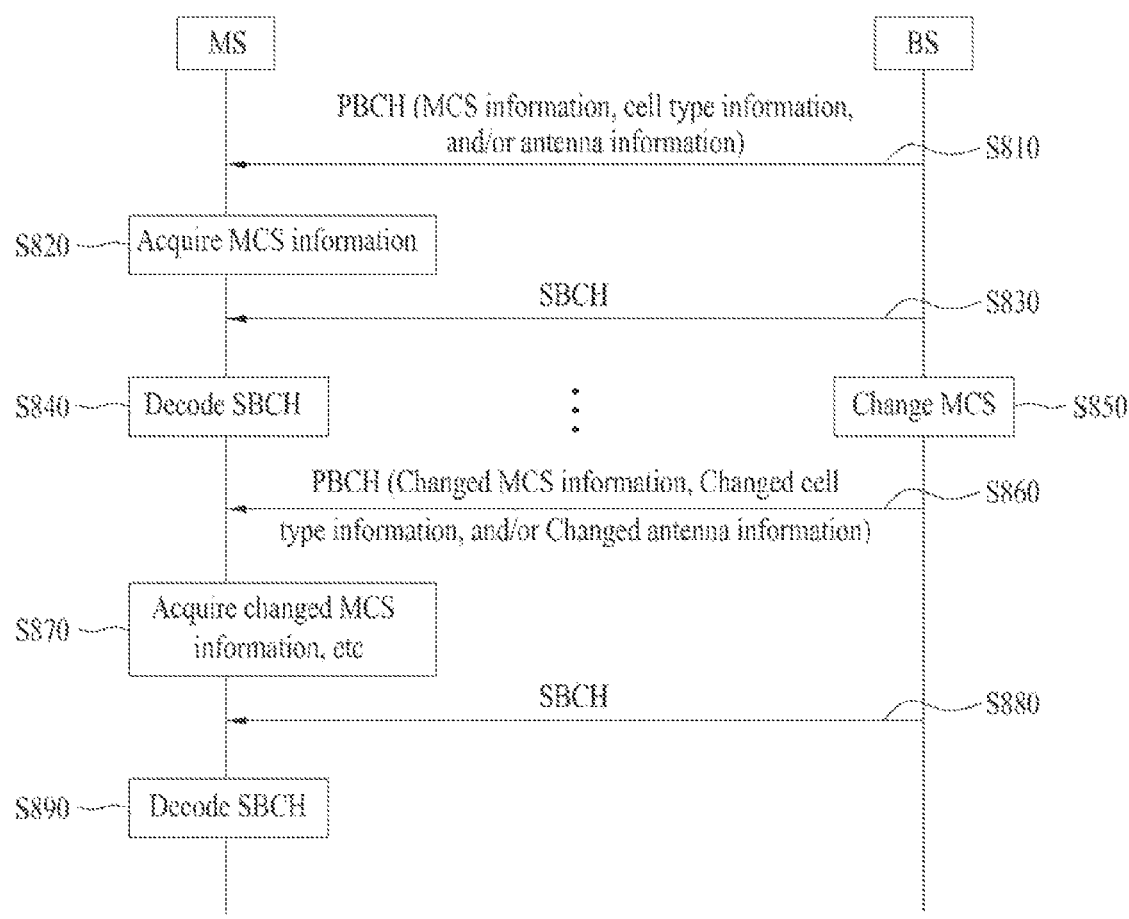
FIG. 8 is a flowchart illustrating a method for transmitting a broadcast channel according to another embodiment of the present invention.

FIG. 8 is a flowchart illustrating a method for transmitting a broadcast channel according to another embodiment of the present invention.

FIG. 8 shows a method for effectively transmitting a broadcast channel under the condition that an MCS level of a PBCH from among the PBCH and the SNBCH is fixed and an MCS level of the SBCH is changed.

In FIG. 8, the BS transmits a PBCH including at least one of MCS information, cell type information and/or antenna information to the MS. In this case, the BS transmits the PBCH to the MS at a fixed size and a low MCS level (Step S810).

The MS decodes the PBCH using a pre-recognized MCS level, so that it can acquire MCS information, cell type information and antenna information that are contained in the PBCH. In this case, the MCS information may represent an MCS level of the next SBCH to be transmitted. If the MCS information is not directly contained in a PBCH, the BS may inform the MS of the MCS level of the SBCH using cell type information and antenna information (Step S820).

The BS may transmit the SBCH using the MCS level informed to the MS (Step S830), and the MS may decode the SBCH using the MCS information acquired in step S820 (Step S840).

As a communication environment is changed, the MCS level of the SBCH is also changed (Step S850).

Therefore, the MS may transmit a PBCH including at least one of the changed MCS information, the changed cell type information, and the changed antenna information to the MS (Step S860).

The MS decodes the PBCH having a fixed MCS level, such that it can acquire the changed MCS information and the like (i.e., the changed cell type information and the changed antenna information) (Step S870).

The BS may transmit the SBCH to the MS using the changed MCS level (Step S880), and the MS may decode the SBCH using the changed MCS level acquired in step S870 (Step S890).

Figure 9:
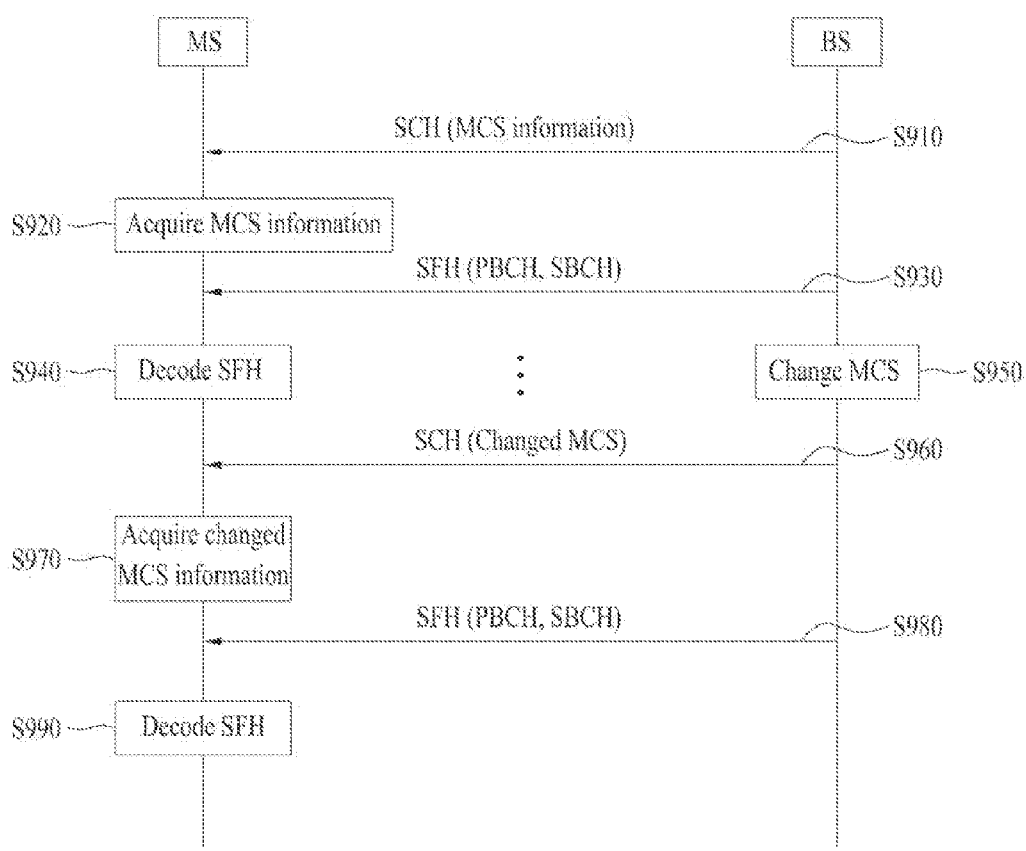
FIG. 9 is a flowchart illustrating another method for transmitting a broadcast channel according to another embodiment of the present invention.

FIG. 9 is a flowchart illustrating another method for transmitting a broadcast channel according to another embodiment of the present invention.

Differently from FIG. 8, FIG. 9 shows an exemplary case in which all of MCS levels of the SFH (i.e., PBCH and SCH) can be changed.

Referring to FIG. 9, the BS may transmit MCS information of an MCS level applied to the SFH to the MS using the SCH. In this case, the MCS levels applied to the PBCH and the SBCH may be established to be identical or different. That is, the MCS information may include information about MCS levels applied to the PBCH and the SBCH (Step S910).

The MS decodes the SCH so that it can acquire MCS information of the MCS level applied to the SFH (Step S920).

The BS may broadcast the SFH using the MCS information informed to the MS in step S910 (Step S930). The MS may decode the SFH using the MCS information acquired in step S920. Namely, the MS may decode the PBCH and the SBCH contained in the SFH (Step S940).

As a communication environment is changed, the MCS level applied to the SFH is also changed (Step S950).

In this case, the BS may include the changed MCS information in the next SCH, and broadcast the resultant SCH (Step S960). The MS decodes the SCH so that it can acquire the changed MCS information (Step S970).

The BS may broadcast the SFH to which the changed MCS is applied to the MS (Step S980), and the MS may decode the SFH using the MCS information acquired in step S970 (Step S990).

Figure 10:
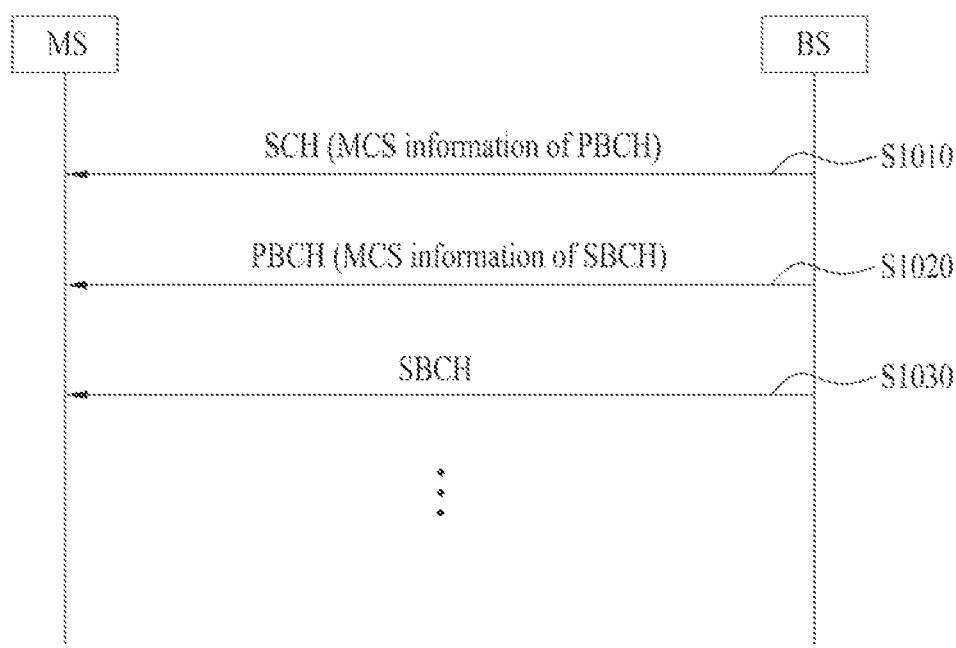
FIG. 10 is a flowchart illustrating a method for transmitting a broadcast channel according to another embodiment of the present invention.

FIG. 10 is a flowchart illustrating a method for transmitting a broadcast channel according to another embodiment of the present invention.

FIG. 10 shows an embodiment in which different MCS levels are applied to a PBCH and an SBCH, and both MCS levels applied to the PBCH and the SBCH can be changed. That is, it is preferable that the SCH does not include a large amount of information, so that all the MCS information of the PBCH and the SBCH is not contained in the SCH and only MCS information about the PBCH is contained in the SCH.

The BS may broadcast the SCH including the MCS information applied to the PBCH (Step S1010).

The BS may broadcast the PBCH using MCS information contained in the SCH (Step S1020).

The MS decides the SCH so that it can acquire MCS information applied to the PBCH. Therefore, the MS can receive the PBCH broadcast by the BS using the acquired MCS information.

In addition, the BS includes MCS information applied to the SBCH in the PBCH, and broadcasts the resultant PBCH. The BS broadcasts the SBCH using MCS information contained in the PBCH, and the MS can receive the SBCH using the MCS information of the SBCH (Step S1030).

Now a description will be given of an MS and a BS for implementing the above-described exemplary embodiments shown in FIGS. 2 to 10, according to another exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc.

The MS according to the embodiments of the present invention may include a lower power Radio Frequency (RF)/Intermediate Frequency (IF) module. The MS may perform a control function for implementing the above-described exemplary embodiments of the present invention, a variable MAC frame control function based on service characteristics and propagation environment, a handover function, an authentication and encryption function, a packet modulation/demodulation function for data transmission and reception, a high-speed packet channel coding function, a real-time MODEM control function, etc., by at least one of the above-described modules, or the MS may further include an additional module, part or means for performing these functions.

The BS may transmit data received from an upper layer to the MS by wire or wirelessly. The BS according to the embodiments of the present invention may include a lower power Radio Frequency (RF)/Intermediate Frequency (IF) module. In addition, the BS may perform a control function for implementing the above-described exemplary embodiments of the present invention, OFDMA packet scheduling, Time Division Duplex (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable to various wireless access systems including a $3^{rd}$ Generation Partnership Project (3GPP) system, a 3GPP2 system, and/or an Institute of Electrical and Electronic Engineers (IEEE) 802.xx system. Besides these wireless access systems, the embodiments of the present invention are applicable to all technical fields in which the wireless access systems are applied.

As apparent from the above description, the exemplary embodiments of the present invention have the following effects.

First, the embodiments of the present invention can effectively transmit the broadcast channel with small overhead.

Second, the embodiments of the present invention can adjust an MCS level of each broadcast channel according to a new SFH structure, thus effectively performing transmission and reception of a control channel.

Third, MCS levels of a primary broadcast channel (PBCH) and a secondary broadcast channel (SBCH) of the SFH are differently established and changed, so that a control channel can be effectively transmitted and received.

Fourth, the embodiments of the present invention can receive a PBCH without using additional information, and at the same time apply various MCSs to the SBCH, so that BCH information can be effectively transmitted using a less amount of resources.

Fifth, the SFH structure according to the embodiments of the present invention can be effectively applied to a system having a different bandwidth. In this case, PBCH and SBCH are configured according to the TDM scheme, so that PBCH decoding performance can be improved using an SCH.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for effectively receiving a broadcast channel, the method comprising:
    receiving, by a mobile station (MS), a synchronization channel (SCH) including first information about a modulation and coding scheme (MCS) applied to a super frame header (SFH); and
    receiving, by the MS, the SFH using the first information,
    wherein the SCH is transmitted using a fixed MCS value, and the SFH is transmitted using a variable MCS value,
    wherein the SFH includes a primary broadcast channel (PBCH) information and a secondary broadcast channel (SBCH) information, and
    wherein the first information represents a predetermined MCS level according to an interference level of a base station (BS), in which the interference level is a Frequency Reuse Factor (FRF).

2. The method according to claim 1, wherein the predetermined MCS level is determined by further considering a cell type of the BS.

3. The method according to claim 1, wherein the predetermined MCS level is determined by further considering a number of transmission (Tx) antennas of the BS.

4. The method according to claim 1, wherein the SCH is allocated to a symbol located after a second symbol of a first subframe contained in a first frame of a superframe, and is allocated earlier than the SFH.

5. The method according to claim 1, further comprising: if the MCS value applied to the SFH is changed, receiving, by the MS, a SCH including second information about a changed MCS; and receiving a SFH using the second information.

6. A method for effectively transmitting a broadcast channel, the method comprising:
    transmitting, by a base station (BS), a synchronization channel (SCH) including first information about a modulation and coding scheme (MCS) applied to a super frame header (SFH); and
    transmitting, by the BS, the SFH using the first information,
    wherein the SCH is transmitted using a fixed MCS value, and the SFH is transmitted using a variable MCS value,
    wherein the SFH includes a primary broadcast channel (PBCH) information and a secondary broadcast channel (SBCH) information, and
    wherein the first information represents a predetermined MCS level according to an interference level of the BS, in which the interference level is a Frequency Reuse Factor (FRF).

7. The method according to claim 6, wherein the predetermined MCS level is determined further considering a cell type of the BS or a number of transmission (Tx) antennas of the BS.

8. The method according to claim 6, wherein the SCH is allocated to a symbol located after a second symbol of a first subframe contained in a first frame of a superframe, and is allocated earlier than the SFH.

9. The method according to claim 6, further comprising: if the MCS value applied to the SFH is changed, transmitting, by the BS, a SCH including second information about a changed MCS; and transmitting a SFH using the second information.

* * * * *